United States Patent
Serrano Gallar et al.

(10) Patent No.: US 10,514,530 B2
(45) Date of Patent: Dec. 24, 2019

(54) MIXED HELIOSTAT FIELD

(71) Applicant: ABENGOA SOLAR NEW TECHNOLOGIES, S.A., Seville (ES)

(72) Inventors: Lucia Serrano Gallar, Seville (ES); Juan Pablo Nuñez Bootello, Seville (ES); Francisco José Cerón García, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 1345 days.

(21) Appl. No.: 14/409,718

(22) PCT Filed: Jun. 18, 2013

(86) PCT No.: PCT/ES2013/000149
§ 371 (c)(1),
(2) Date: Dec. 19, 2014

(87) PCT Pub. No.: WO2013/190154
PCT Pub. Date: Dec. 27, 2013

(65) Prior Publication Data
US 2015/0323772 A1    Nov. 12, 2015

(30) Foreign Application Priority Data

Jun. 19, 2012  (ES) .................. 201200654

(51) Int. Cl.
*G02B 19/00* (2006.01)
*G02B 5/09* (2006.01)
(Continued)

(52) U.S. Cl.
CPC .......... *G02B 19/0042* (2013.01); *F24S 23/70* (2018.05); *F24S 23/77* (2018.05);
(Continued)

(58) Field of Classification Search
CPC ............ G02B 19/0019; G02B 19/0042; G02B 5/09; G02B 5/10; G02B 19/0023; F24S 23/70;
(Continued)

(56) References Cited

U.S. PATENT DOCUMENTS 2,707,903 A * 5/1955 Trombe ............... G02B 5/10
359/849
4,110,009 A * 8/1978 Bunch .................. F24S 23/77
359/853
(Continued)

FOREIGN PATENT DOCUMENTS

CN      101952669 A    1/2011
DE      10248064 B4   11/2007
(Continued)

OTHER PUBLICATIONS

International Search Report for PCT/ES2013/000149 dated Sep. 25, 2013, all pages.
(Continued)

*Primary Examiner* — Ricky D Shafer
(74) *Attorney, Agent, or Firm* — Kilpatrick Townsend & Stockton LLP

(57) ABSTRACT

Mixed heliostat field combining, in the same field, heliostats of different sizes and/or with different types of facets, all of them having at least one facet and being canted or not, and either having spherical, cylindrical, flat or quasi-flat (spherical with a high curvature radius) facets, such that the solar field is optimised in order to minimise shadows and blockages between heliostats, as a result of correct positioning of the heliostats in the field.

24 Claims, 6 Drawing Sheets

(51) Int. Cl.
  *G02B 5/10* (2006.01)
  *F24S 23/70* (2018.01)
  *F24S 23/77* (2018.01)
  *F24S 20/00* (2018.01)

(52) U.S. Cl.
  CPC ............... *F24S 23/80* (2018.05); *G02B 5/09* (2013.01); *G02B 5/10* (2013.01); *G02B 19/0019* (2013.01); *G02B 19/0023* (2013.01); *F24S 2020/16* (2018.05); *F24S 2023/832* (2018.05); *F24S 2023/87* (2018.05); *F24S 2023/874* (2018.05); *F24S 2023/876* (2018.05); *Y02E 10/40* (2013.01)

(58) Field of Classification Search
  CPC ........ F24S 24/77; F24S 23/80; F24S 2020/16; F24S 2023/87; F24S 2023/874; F24S 2023/876; Y02E 10/40
  USPC .............. 359/853; 353/3; 126/684, 687, 689
  See application file for complete search history.

(56) References Cited

U.S. PATENT DOCUMENTS

| | | | |
|---|---|---|---|
| 4,276,872 A | | 7/1981 | Blake et al. |
| 4,423,926 A | * | 1/1984 | Stolpin ................... F24S 23/71 359/853 |
| 5,862,799 A | | 1/1999 | Yogev et al. |
| 5,979,438 A | * | 11/1999 | Nakamura .............. F24S 23/71 126/680 |
| 2004/0004175 A1 | | 1/2004 | Nakamura |
| 2007/0221208 A1 | | 9/2007 | Goldman |
| 2009/0133685 A1 | | 5/2009 | Pham et al. |
| 2010/0139644 A1 | * | 6/2010 | Schwarzbach ............ F24J 2/07 126/573 |
| 2012/0090323 A1 | | 4/2012 | Gonzales Marcelino Sanchez et al. |

FOREIGN PATENT DOCUMENTS

| | | |
|---|---|---|
| WO | 2009126263 A1 | 10/2009 |
| WO | 2009152574 A1 | 12/2009 |

OTHER PUBLICATIONS

First Office Action and Search Report for CN 201380038544,0 dated Apr. 21, 2016, all pages.
Supplementary European Search Report for EP 13807349 completed Mar. 30, 2016, all pages.
Examination Report for UAE/P/1401/2014 issued by KIPO dated Jun. 2018, 8 pages.
Search Report for UAE/P/1401/2014 issued by KIPO dated Jun. 2018, 4 pages.
Office action for MX/a/2014/015683 issued by the Mexican Patent Division dated Aug. 23, 2017, 4 pages.
Search Report for ES 2438890 completed by the Patent Office of Spain dated Oct. 7, 2013, 4 pages.
PCT/ES2013/000149 International Search Report, dated Sep. 25, 2013.

* cited by examiner

MIXED HELIOSTAT FIELD

RELATED APPLICATIONS

This application is a 35 USC § 371 U.S. National Stage Entry of PCT Application Serial No. PCT/ES2013/000149 (WO 2013/190154) filed on Jun. 18, 2013, which claims priority to Spain Patent Application No. P201200654, filed on Jun. 19, 2012, which are each incorporated herein in their entirety by reference.

TECHNICAL FIELD OF THE INVENTION

The technical field of this invention is the production of electricity by concentrating solar power on a central receiver mounted atop a tower. Within this technology, the invention refers to the field of heliostats that surrounds the receiver and which direct the solar radiation towards it.

BACKGROUND OF THE INVENTION

A heliostat is a mirror-like reflective surface, intended to reflect solar radiation and direct it towards a specific target.

These heliostats are adjustable and are normally provided with a two-axis tracking system to follow the sun individually on two axes. These drives enable the heliostat to achieve azimuth and elevation movement.

In thermoelectric central receiver power plants, the heliostat forms part of the solar field. The solar field consists of a series of heliostats, the main aim of which is to reflect solar radiation and direct it toward a receiver situated at the top of a tower. Therefore, the heliostat normal is always halfway between the sun and the tower receiver.

Inside the receiver is a fluid which is heated by the solar radiation and is either passed through a turbine directly to generate electricity or it is used afterwards in a heat exchanger to produce vapour which will finally be passed through a turbine.

The heliostat therefore, is an element that has a reflective surface, a support structure, an azimuth and elevation drive mechanism, a pedestal, with its corresponding foundations and a local control system.

Various types and configurations of heliostats have been developed over time.

Within the state of the art we can find heliostats with a continuous reflective surface, heliostats using Fresnel reflecting system, a stretched membrane heliostat or a faceted heliostat.

Heliostats with a continuous reflective surface can have completely flat mirrors, both in terms of structure and reflective surface, such as the case of the heliostats of patent US2009/0007901, which we shall discuss later on.

Stretched membrane heliostats are mainly made up of a circular structure and a slightly curved stretched membrane, with a reflective surface where the solar energy is concentrated.

This curvature is what enables the heliostat to concentrate the sun's radiation.

With regard to the faceted heliostat, in this case the heliostat consists of a number of smaller reflective elements, together with a structure, which we shall call facets and which all together form the final heliostat when the facet is arranged in a specific orientation (known as "canting").

With regard to faceted heliostats, there are a number of configurations for the arrangement of these facets in the state of the art. U.S. Pat. No. 4,276,872, through its drawings, describes a faceted heliostat, where the facets that make up the heliostat, have a structure or support as well as a flat reflective surface.

In order to provide faceted heliostats with the ability to concentrate the sun's radiation and thus get the maximum thermal solar power radiation into the receiver, the reflective surface of the facets can be curved.

Patent ES2351755 describes a system used to manufacture heliostat facets, made up of a reflective surface and a support where the reflective surface is curved beforehand.

Patent ES2326586 describes a facet for a heliostat, configured from a flat structure, in which the reflective body is also curved.

Depending on the shape of the reflective surface, there are two types of heliostats: Non-imaging focusing heliostats and imaging focusing heliostats.

) Non-imaging focusing heliostats such as the one proposed in "Non-imaging focusing heliostat"—Y. T. Chen, K. K. Chong, T. P. Bligh, L. C. Chen, Jasmy Yunus, K. S. Kannan, B. H. Lim, C. S. Lim, M. A. Alias, Noriah Bidin, Omar Aliman, Sahar Salehan, SHK. ABD. Rezan S.A.H., C. M. Tam and K. K. Tan., enable the astigmatism effect to be reduced, the effect of optical aberration, which can be translated into the lack of power in the receiver for a cavity aperture attached beforehand and which occurs when the incidence angles (angle of the heliostat's normal to the incident beam which ranges from 0 to 90°) are different from zero. Unfortunately there is a cost issue with this type of heliostat because the tracking is rotation-elevation: with one of the heliostat's main axes always remaining perpendicular and the other always parallel to the flat plane formed by the incident beam, the heliostat's normal and the reflected beam. These two rotation-elevation movements mean the heliostat's centre of gravity does not remain in line with the pedestal, which involves more complex structures than normal. Also, additional mechanisms are required for the different facets, given that each of them rotate independently from one another, so an axis orientation can be achieved that directs the beams to the centre of the receiver.

In other execution methods, the heliostats are Fresnel-type reflectors with an azimuth and altitude-type tracking system. This geometry has the disadvantage of limited movement ranges (patent ES1074545U) and second order cosine effects that counteract the savings related to eliminating the curvature of the structure.

2) Furthermore, imaging focusing heliostats include flat heliostats and spherical or revolving parabolic heliostats.

Flat heliostats, for a defined design acceptance β(angle that takes into account the different errors related to the manufacturing and assembly of the heliostat as well as the angle subtended by the sun) do not have a concentration capacity and they project their own aperture (mirror surface) on the receiver, amplified linearly in distance by the acceptance angle. If large sizes were used, the losses as a result of an overflow on to the receiver aperture (losses due to the amount of radiation reflected by the concentrator and not reached by the receiver) for isolated heliostats would make the investment made for the heliostat itself unfeasible.

These flat and small heliostats do not concentrate but they enable modular plants to be constructed with a significant reduction in structural and foundation costs and savings on the curvature of the mirrors, however, it does mean that operating and maintenance costs increase, given that more mechanisms, control and related procedures are required in order to provide the same thermal power as we could generate with fields with larger heliostats.

These fields with flat and small heliostats are described in the aforementioned patent US2009/007901.

For heliostats with a reflective rotating parabolic surface, the optical concentration is different: defined design acceptance and for practically zero solar radiation incidence angles, this type of collector maximises the concentration when the focal distance is around 0.6 times the aperture with the concentration reached being C=0.25 (1/sen2δ)=0.25 Cmax; i.e., 0.225 times the maximum concentration possible for the optical in question, where δ is the semi-angle of acceptance β=2 δ. In practice the heliostats of spherically formed tower plants have a much higher focal distance than the optimal one under the criteria of maximum capture Cmax=1/sen2δ; which means that, with small or almost zero incidence angles, the heliostat concentrates less the further away it is from the receiver, with the heliostat failing to concentrate at a specific distance, i.e., the generated spot reflected on the receiver is larger than the heliostat's actual aperture and only considering the rays that are inside the collector's design acceptance. It is important to point out that, for small incidence angles and normal focal distances in the tower plant heliostat fields, the parabolic geometry is similar to the spherical geometry. Therefore taking the geometry of spherical heliostats, for these or greater focal distances, the size of the spot on the receiver is the same aiming with a large heliostat or with a small one with the same curvature always for almost zero incidence angles. The difference between the two appears for incidence angles greater than zero (incidence angle is the angled formed by the vector that directs the incident beam on a point of the heliostat, with the normal to the reflective surface on said point), so for large surface spherical concentrators, a more pronounced astigmatism effect occurs, which leads to a large and more wide-spread image.

Based on the focal distance of the heliostat (f) defined as the distance from the heliostat pivoting point (centre of the reflective surface) to the focal point situated on top of the tower $f=\sqrt{(X-X_0)^2+(Y-Y_0)^2(Z-Z_0)^2}$; the radius of the curvature of the heliostat in question is defined as R theoretical=5f, with $R=2\sqrt{(X-X_0)^2+(Y-Y_0)^2(Z-Z_0)^2}$ where X, Y, Z are the heliostat positioning coordinates and (X0, Y0, Z0) are the focal point coordinates. It is important to point out that tower plants with this type of large surface parabolic or spherical heliostats have a number of different curvatures in the field: i.e., each heliostat has a different curvature depending on its positon in the solar field and its distance from the tower.

These types of spherical heliostats are also more difficult to assemble and manufacture as a result of having to curve the facet mirrors, then having to cant them on the heliostat (orientate the facets on the heliostat structure so the final shape is parabolic or a perfect sphere) and cant the structure, i.e., configure it with the curvature and desired shape depending on its position with regard to the tower. However, it has the advantage of lower operating and maintenance costs, maintaining low structural, control and instrumentation and mechanism costs.

3) In patent ES8306688A1 it already mentions the possibility of the reflective surface of the heliostat facets being flat, incorporating the mirror supports, to regulate the orientation of these around the vertical and horizontal axes.

The invention at hand, intends to bring together the advantages in one solar field with both flat facet heliostats and heliostats with parabolic or spherical surfaces and a mixture of both optimising the size, the total cost and the distribution on the plant if applicable.

INVENTION DESCRIPTION

The invention refers to a mixed heliostat field for plants with a central receiver for solar energy concentration, where different types of heliostats are combined, with the aim of optimising the losses due to astigmatism thereof and the cost associated with said field. The mixed heliostat solar field uses the most suitable heliostat in each area of the field. Below are the different types of heliostats (with canting understood to be the general curvature given to the heliostat by orientating each of its facets independently):

1. Large heliostats S≥120 m2 with canted spherical or parabolic structure
   1.1 Spherical facets
   1.2 Cylindrical facets
   1.3 Flat or quasi-flat facets (spherical with a high curvature radius)
2. Medium heliostats 20 m2≤S<120 m2 with canted spherical or parabolic structure and:
   2.1 Spherical facets
   2.2 Cylindrical facets
   2.3 Flat or quasi-flat facets (spherical with a high curvature radius)
3. Small heliostats with a single facet S<20 m2 with three configurations:
   3.1 Spherical facet
   3.2 Cylindrical facet
   3.3 Flat or quasi-flat facet (spherical with a high curvature radius)

In the case of cylindrical facets, it is important to note that they are only canted in one direction, i.e., according to its greatest direction and with the same curvature radius as that of the structure.

In the case of spherical facets, they have a curvature radius that can be the same as or different to that of the structure and they are orientated or canted giving the heliostat a spherical curvature.

The selection criteria for one or another heliostat in the different areas of heliostat fields are as follows:

1—Cosine effect: The loss of reflective area due to high incidence angles between the incident or reflected rays and the heliostat's normal shown in the following expression: $A_{efectiva}=\cos\theta A_{real}$ where θ is the angle of incidence.

It is important to point out that the angle of incidence of the sun is a parameter that depends on the day and the time of the year and which cannot be influenced, once the optimal azimuth and distance positions from the heliostat tower in the solar field have been established. Therefore each heliostat in the solar field will have an average annual angle of incidence that indicates its contribution to the electricity generated in the plant together with other parameters.

2—Need for an area of the solar field that provides a minimum size concentrated heat transfer, even for high angles of incidence, enabling you to distribute the power as needed. For example, with the aim of focusing on specific areas where we want to increase the temperature, enabling you to control possible problems in the receiver (salt power towers, in which solidification may occur and which require a high concentration of radiation flow). This detailed control, which enables certain areas to be heated in a special way, thanks to the heliostats with reduced spots that can be oriented as desired, is what is known as active control.

3—View of the cavity where the receiver is housed from the heliostat in question, calculated according to the angle of visibility or a formed by the ray reflected with the cavity's plane.

4—Losses through the atmospheric transmission coefficient: Effect caused by the atmosphere causing the power associated with the reflected ray to be diminished. It is normally expressed by a polynomial that depends on the distance of the heliostat from the receiver and a series of characteristic coefficients from each latitude and which is related to the atmospheric dispersion effects, through the existence of greater or lower amounts of particles in the air.

The following considerations shall also be taken into account:

5—In the case of angles of incidence of almost zero, all the heliostats in the group generate a similar image.

6—In the case of high angles of incidence, the simulations carried out that compare type 1.1, 1.2 heliostats in a representative position, show that the spots projected by each of them on the opening are similar for both.

7—Studies carried out for a complete plant generating in excess of 20 MW of electrical power with type 1.3 heliostats enable us to conclude that, although the density peaks of the energy flow in the receiver descend, surprisingly the overflow values do not differ so much from the case of 1.1 and 1.2 type heliostats, For plants with a nominal power in excess of 20 MW, the use therefore of type 1.2 and 1.3 heliostats in all or some positions of the field, instead of type 1.1 heliostats currently used in the heliostat fields in the state of the art, would represent great savings in the cost of the heliostat, given that all the mirrors on the surface of the concentrator do not require double curvature, with said capacity being maintained thanks to the parabolic or spherical canted structure.

8—If heliostats need to be used that generate a very controlled spot regardless of the specific angle of incidence, the astigmatism effect produced by the spherical aberration of the spherical facets (the loss due to overflow in the receiver for a defined receiver size) has to be combatted and therefore type 2 and 3 heliostats could be used for this. The smaller the heliostat, the less overflowing these generate in the receiver for non-zero angles of incidence. Also, it is the heliostats closest to the tower where most potential improvement can be seen by reducing the size; given that there is a critical position with regard to the tower which means the effect of the distance in the astigmatism is greater than that of the size of the mirror itself.

9—For heliostats that are very close to the tower with very pronounced curvature radiuses, difficulties may arise when manufacturing the spherical facets, which require very large curvatures (small curvature radiuses) for reflective surfaces that are fragile. For these cases, the invention includes the possibility of placing 1.2 or 1.3 type heliostats in the first rows of the solar field, with cylindrical facets, which solely require curvature for one of their axes, which means manufacturing them is much easier, or simply with flat facets.

10—In areas of the field in which there is low visibility of the receiver (the angles of visibility a are greater than 35°), the use of type 2 or 3 heliostats is suggested, i.e., medium or small heliostats that enable a much smaller image to be generated than with large type 1 heliostats, which fits entirely inside the cavity.

11—If a solar field is used with type 1.2, 1.3, 2.2, 2.3 heliostats, the number of curvature references may be reduced, i.e., instead of each heliostat being totally or partially canted (both the curvature of its facets as well as its structure) with a different theoretical radius, according to its distance from the tower, it suggests establishing groups of heliostats with a similar theoretical curvature radius, which will all have the same real curvature radius as the theoretical curvature of the heliostat in the group that is furthest away from the receiver or close to the median of all the theoretical curvature radiuses for said group.

The combination therefore in a solar field of all or some of the types of heliostats listed above could lead to an increased optical efficiency and a finer control of the receiver. Furthermore, reducing the number of spherically shaped facets needed in total in the solar field will enable a significant reduction in costs for a thermoelectric solar plant, given that the cost of the solar field represents approximately 30% of the cost thereof.

In all cases and in all combinations, the solar field will be optimised to minimize blocking and shading between heliostats, thanks to the correct positioning of these in the field.

Also any type of field is considered: North, South, circular . . .

DRAWING DESCRIPTION

In addition to the description, a series of drawings have been included to aid in understanding the invention, which include, but are not limited to, the following:

FIG. 1: Flat mirror with a half-angle of acceptance δ
FIG. 2: Flat heliostat facet from the state of the art
FIG. 3: Non-imaging focusing heliostat from the state of the art
FIG. 4: Spherically canted heliostats with flat facets
FIG. 5: Heliostat with cylindrical facets
FIG. 6: Example of cosine effect in heliostat field North
FIG. 7: Angle of visibility of the receiver in the heliostat field
FIG. 8: First preferred embodiment in mixed solar field
FIG. 9: Second preferred embodiment in mixed solar field
FIG. 10: Third preferred embodiment in mixed solar field
FIG. 11: Fourth preferred embodiment in mixed solar field The references that appear in the figures represent:
1. Area of mixed heliostat field where $\alpha<35°$ and $\cos\theta>0.78$
2. Area of mixed heliostat field where $\alpha<15°$ and $\cos\theta<0.78$
3. Area of mixed heliostat field where $\alpha<35°$ and $\cos\theta>0.78$
4. Area of mixed heliostat field where $\alpha<15°$ and $\cos\theta<0.78$
5. Area of mixed heliostat field with $\alpha<25°$
6. Area of mixed heliostat field with $\alpha<25°$
7. Area of mixed heliostat field with angles of incidence <45% from the maximum annual angle of incidence and $\alpha<25°$
8. Area of mixed heliostat field with $\alpha<25°$
9. Area of mixed heliostat field with angles of incidence <45% from the maximum annual angle of incidence
10. Area of mixed heliostat field with angles of incidence <45% from the maximum annual angle of incidence and $\alpha<25°$
11. Area of mixed heliostat field with $\alpha<25°$
12. Area of mixed heliostat field with angles of incidence <45% from the maximum annual angle of incidence.
13. Area of mixed heliostat field with angles of incidence <30% from the maximum annual angle of incidence
18. Area of heliostat field with very high receiver visibility $\alpha<10°$
19. Area of heliostat field with very high receiver visibility $10°<\alpha<15°$ 20. Area of heliostat field with high receiver visibility 15°<α<20°
21. Area of heliostat field with high receiver visibility 20°<α<25°
22. Area of heliostat field with medium receiver visibility 25°<α<30°
23. Area of heliostat field with medium receiver visibility 30°<α<35°
24. Area of heliostat field with low receiver visibility 35°<α<40°
25. Area of heliostat field with low receiver visibility α>40°
30. Area of the heliostat field with cosine effect between 0.911 and 0.811
31. Area of the heliostat field with cosine effect between 0.811 and 0.761
32. Area of the heliostat field with cosine effect between 0.761 and 0.711
33. Area of the heliostat field with cosine effect between 0.711 and 0.661
34. Area of the heliostat field with cosine effect between 0.661 and 0.55

PREFERRED EMBODIMENT OF THE INVENTION

In view of the figures, below is a preferred embodiment of the system described in this invention.

Before beginning the description of a specific mixed field, attached are a series of drawings that show some of the different types of heliostats that can be combined.

The heliostat field proposed in this invention can be combined in a single central receiver plant:
  Very large heliostats, typically 120 m2 or 140 m2, with spherical or parabolic canted profiles, with 28 or 32 flat facets respectively,
  Very large heliostats, 120 or 140 m2 with spherical or parabolic canted profiles with 28 or 32 facets shaped spherically or cylindrically.
  Medium size heliostats, typically 20 m2 with spherical or parabolic canted profiles with only a few (4 or 5) flat facets, spherically or cylindrically shaped and
  small heliostats typically 4 m2 with a flat or cylindrical facet.

The choice of one or another type of heliostat in the different field positions, is mainly based on the cost minimisation criteria of the plant; on the average annual angle of incidence (which translates into annual cosine effect and astigmatic effects), the visibility of the heliostat receiver and on the possible need for the plant to have part of the solar field able to generate minimum size sun spots in order to help with the possible control of the receiver's finer transfer of heat.

Figure 6:
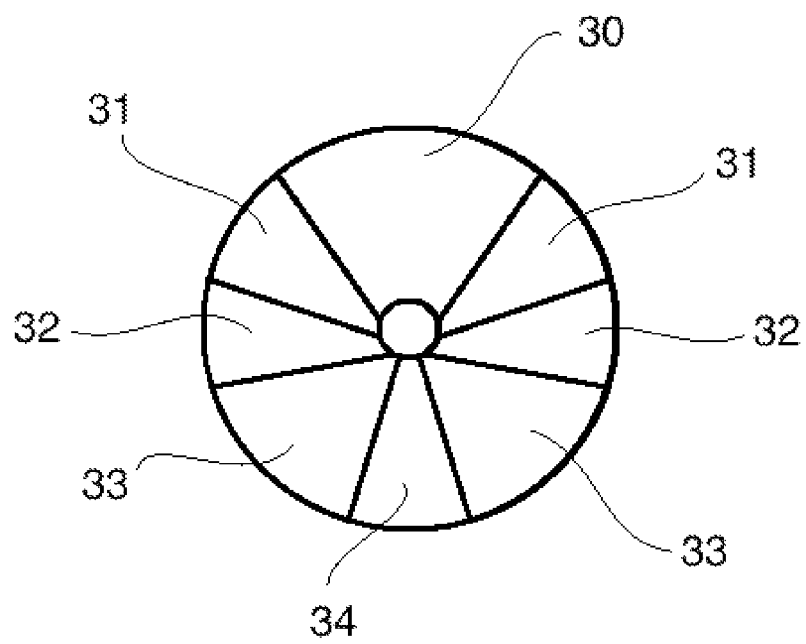

In the specific case of FIG. 6, it shows an example of the cosine effect in a North heliostat field, specifically it is a circular field at latitude 37.24°. It schematically displays different ranges of cosine effect distributed as follows: Interval of 0.911 to 0.811 (30), of 0.811 to 0.761 (31), of 0.761 to 0.711 (32), of 0.711 to 0.661 (33) and of 0.661 to 0.55 (34).

Figure 7:
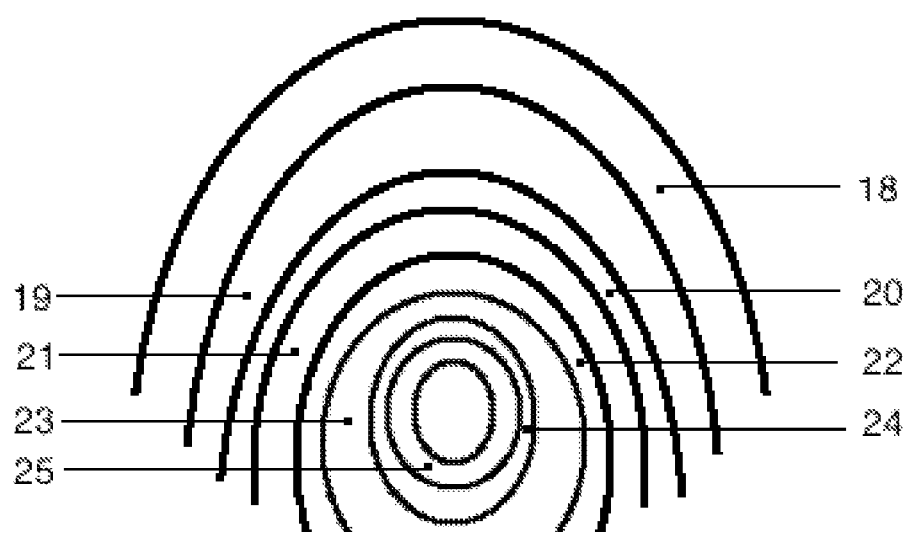

FIG. 7 shows the receiver visibility of the heliostats calculated for a circular field in North latitude and external cylindrical receiver. The heliostat field is schematically divided into eight areas (18, 25) in which the heliostat view of the receiver varies, with the areas with greater visibility or very high visibility being areas (18) and (19) with α<15°, areas (20) and (21) area areas of high visibility with a visibility angle of 15°<α<25°, the areas with medium visibility (22) and (23) are visibility angles of 25°<α<35°, and areas with low visibility (24) and (25) are for α>35°.

Figure 1:
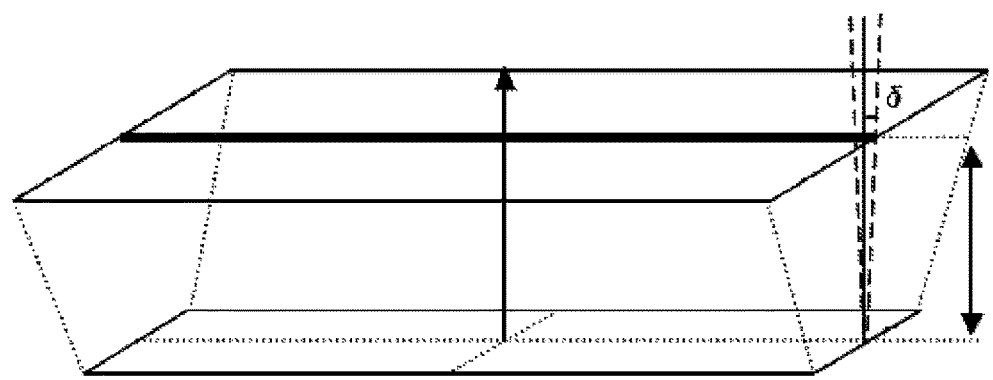
FIG. 1 shows a flat mirror with a half-angle of acceptance δ
Figure 2:
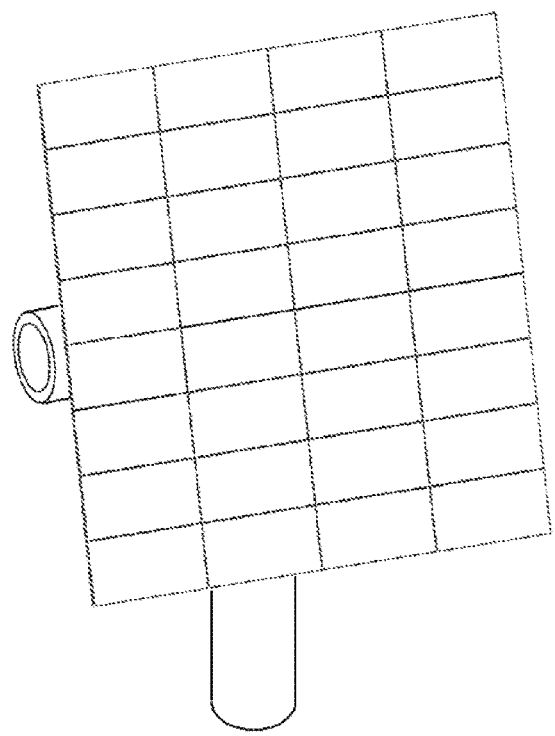
FIG. 2 shows an example of a flat heliostat facet.
Figure 3:
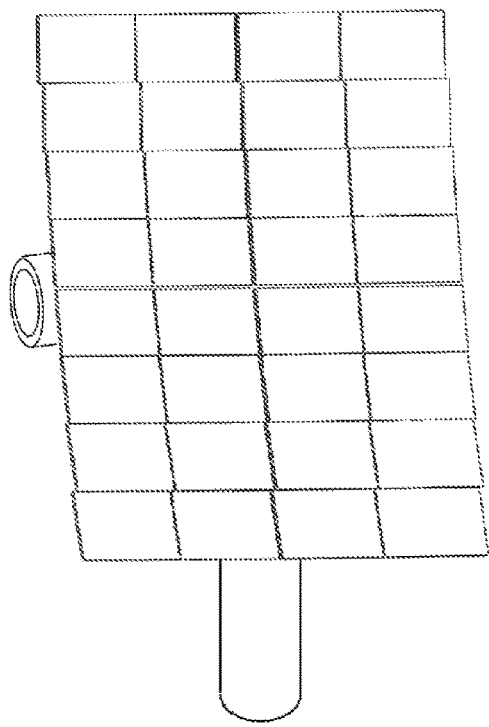
FIG. 3 shows a non-imaging focusing heliostat
Figure 8:
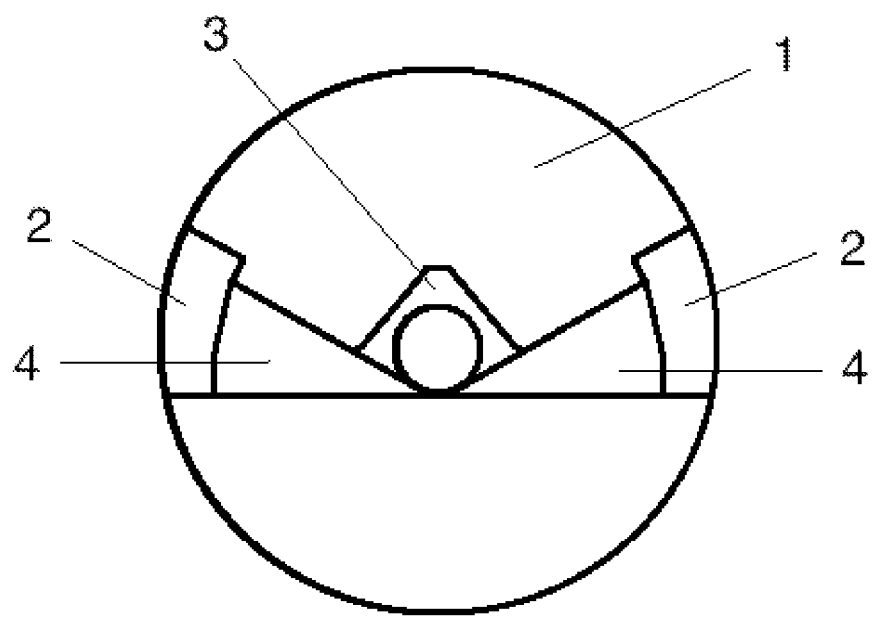

FIG. 8 shows the first preferred case for a heliostat field, in North latitude, in which the distribution of the different types of heliostats is outlined as follows:
  Area 1: Made up of type 1.3 heliostats, i.e. very big heliostats with a spherical or parabolic canted structure and flat facets as represented in FIG. 3, which are located in that area of the field, in which the average annual angle of incidence is greater than 45% of the field's maximum annual angle of incidence (for a latitude of 37.34° and north field, angle of incidence greater than 45° or average annual cosine effect greater than 0.78) and the visibility of the heliostat is medium or high.

$\cos \theta > 0.78$

15°<α<35°

Area 2: Made up of type 1.3 heliostats, i.e. very big heliostats with a spherical or parabolic canted structure and flat facets which are located in the area of the field in which the average annual angle of incidence is less than 45° of the field's maximum annual angle of incidence (for a latitude of 37.34° and north field, angle of incidence less than 45° or average annual cosine effect less than 0.78) and the visibility of the receiver is very high.

$\cos \theta < 0.78$

α<15°

Figure 4:
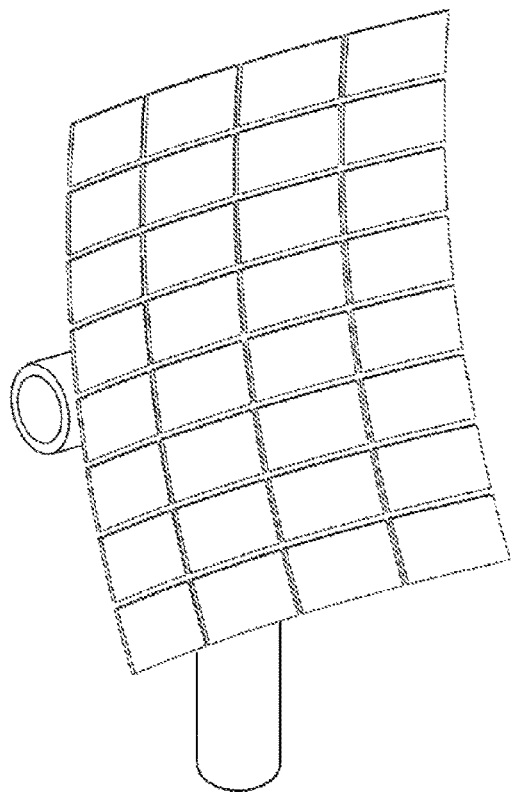
FIG. 4 represents a spherically canted heliostat with flat facets, i.e. each of the flat facets is orientated in such a way that the entire heliostat acquires a spherical curvature.
Figure 5:
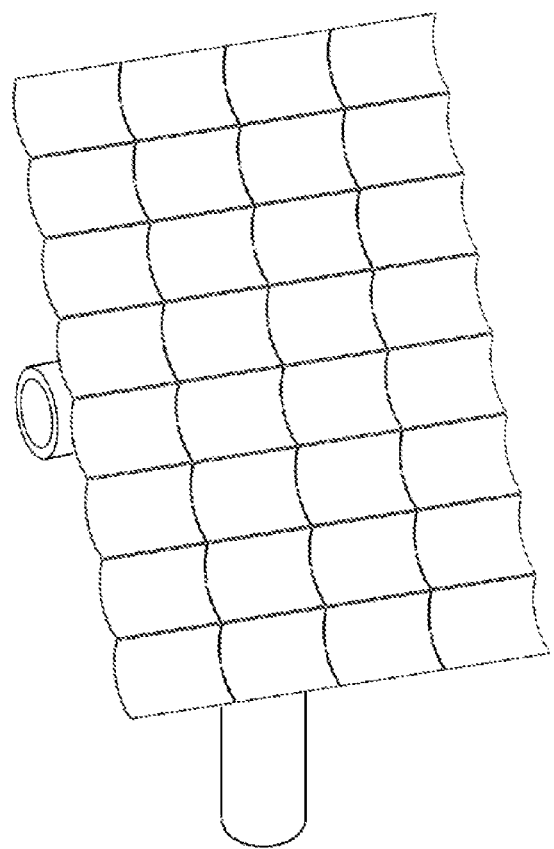
FIG. 5 shows a heliostat made up of cylindrical facets.

Area 3: Made up of 2.1 or 2.2 type heliostats, i.e. medium size heliostats with a spherical or parabolic canted structure and cylindrical facets as represented in FIG. 4, which are located in the area of the field in which the average annual angle of incidence is greater than 45% of the field's maximum annual angle of incidence (for a latitude of 37.34° and north field, angle of incidence greater than 45° or average annual cosine effect greater than 0.78) and the visibility of the receiver is low.

$\cos \theta > 0.78$

α>35°

If part of the solar field needs to be able to generate a minimum size sunspot in order to carry out an active control and thus help with the eventual control of a finer transfer of heat to the receiver, small parabolic or spherical canted heliostats can be included here with a low number of facets (typically 4 or 5), or small heliostats with a flat plane, 3.2 and 3.3 type heliostats.

Area 4: Made up of smaller heliostats than the rest of the field heliostats with spherical facets (preferably small type 3.1 or 3.2 heliostats), which are located in the area of the field in which the average annual angle of incidence is greater than 45% of the field's maximum annual angle of incidence (for a latitude of 37.34° and north field, angle of incidence lower than 45° or average annual cosine effect lower than 0.78) and the visibility of the receiver is medium or low.

$$\cos \theta < 0.78$$
$$\alpha > 25°$$

Preferably the heliostats in areas 1, 2 are 120m2 with 28 facets distributed in 4 columns and 7 rows and the heliostats in area 3 are 20 m2. For heliostats in area 3, 4 m2 heliostats with 1 facet can also be used. For area 4 the preferred embodiment is 4 m2 heliostats.

Figure 9:
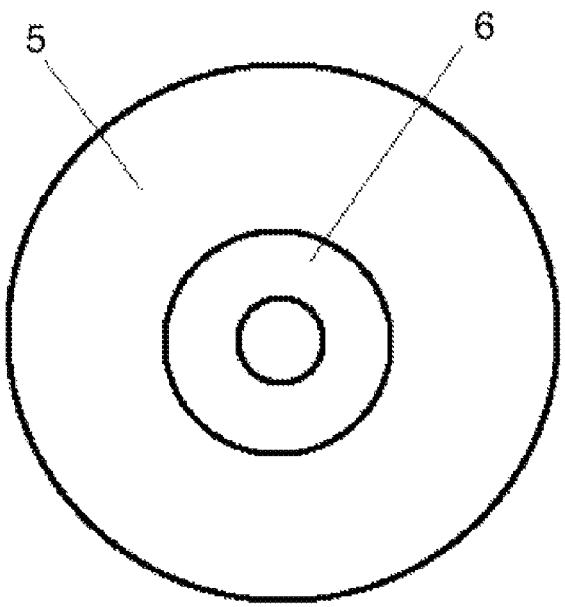

FIG. 9 shows the second case of preferred embodiment of the invention, with high atmospheric transmission coefficient in excess of 0.95:

Area 5: high or very high receiver visibility ($\alpha<25°$), heliostats 1.2 or 1.3

Area 6: medium or low visibility (angles of visibility of the receiver $\alpha>25°$), reserved for heliostats with no astigmatism with reduced spot: Heliostat 3.2 or 3.3 around 4 m2

Figure 10:
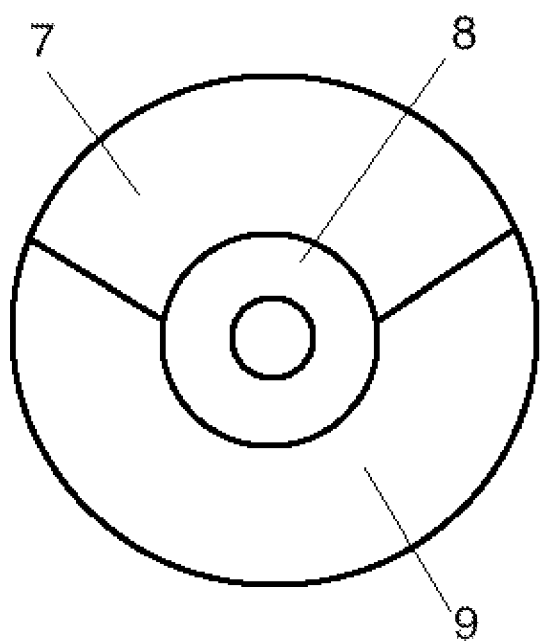

FIG. 10 shows the third case of preferred embodiment of the invention, with high atmospheric transmission coefficient in excess of 0.95:

Area 7: low angles of incidence (less than 45% of the maximum annual angle of incidence) and high or very high receiver visibility ($\alpha$ less than 25°), heliostats 1.2 or 1.3

Area 8: medium or low visibility ($\alpha>25°$), heliostats with no astigmatism with reduced spot type 3.1 or 3.2

Area 9: high angles of incidence (greater than 45% of the maximum annual angle of incidence), reserved for heliostats with no astigmatism with reduced spot, 2.1 or 2.2 20 m2 heliostat with 5 facets.

Figure 11:
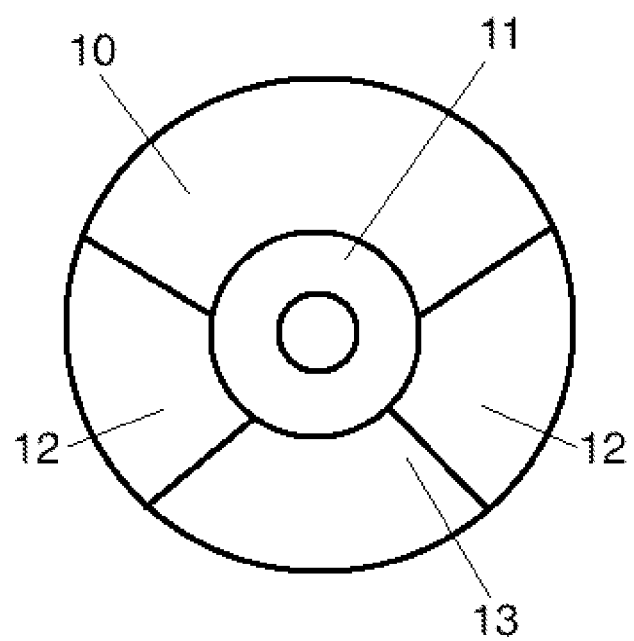

FIG. 11 shows the fourth case of preferred embodiment of the invention, with low atmospheric transmission coefficient lower than 0.95:

Area 10: low angles of incidence (less than 45% of the maximum annual angle of incidence) and high or very high receiver visibility a less than 25° heliostat 1.2 or 1.3

Area 11: medium or low visibility ($\alpha>25°$), heliostats with no astigmatism with reduced spot type 3.2 or 3.3.

Area 12: low angles of incidence (lower than 45% of the maximum annual angle of incidence), reserved for heliostats with no astigmatism with reduced spot: heliostat 2.1 or 2.2

Area 13: low angles of incidence (lower than 30% of the maximum annual angle of incidence), reserved for heliostats with no astigmatism with reduced spot type 3.2 or 3.3.

The invention claimed is:

1. A mixed heliostat field for a solar concentration plant having a central receiver, wherein the mixed heliostat field minimizes losses due to astigmatism and a cosine effect, and maximizes visibility of each heliostat, the mixed heliostat field comprising a plurality of heliostats installed in a single field, wherein:
   each of the heliostats has at least one facet;
   the plurality of heliostats comprises heliostats of at least two different sizes and the plurality of heliostats comprises a first heliostat comprising facets of a first facet type and a second heliostat comprising facets of a second facet type, the first and second facet types being selected from the group of facet types consisting of spherical, cylindrical, and flat;
   the plurality of heliostats are actively controlled;
   the plurality of heliostats comprises heliostats having different canted profiles; and
   the heliostat field comprises at least a first area and a second area, the heliostats in the first area being on average farther from the central receiver than the heliostats in the second area, and the heliostats in the first area having larger surface areas than the heliostats in the second area.

2. The mixed heliostat field of claim 1, wherein the plurality of heliostats comprises large heliostats, with a surface area of at least 120 m$^2$.

3. The mixed heliostat field of claim 2, wherein the large heliostats have canted spherical facets.

4. The mixed heliostat field of claim 2, wherein the large heliostats have parabolic or spherical canted cylindrical facets in a direction of the larger dimension.

5. The mixed heliostat field of claim 2, wherein the large heliostats have flat or spherical facets.

6. The mixed heliostat field of claim 2, wherein the field is established with groups of heliostats with a similar theoretical curvature radius, all of them with a real curvature radius equivalent to the theoretical curvature radius of the heliostat of the group furthest from the receiver or closest to an average of all the theoretical curvature radiuses for that group.

7. The mixed heliostat field of claim 2, wherein the plurality of heliostats are distributed in four areas as follows:
   Area 1: Made up of a first portion of the large heliostats with a spherical or parabolic canted structure and flat or spherical facets and which are located in that area of the field in which an average annual angle of incidence is greater than 45% of a maximum annual angle of incidence of the field and a visibility of the heliostat is medium or high, wherein a medium visibility means having an angle of visibility $\alpha$ greater than 25° and less than 35°, and a high visibility means having an angle of visibility $\alpha$ greater than 15° and less than 25°;
   Area 2: Made up of a second portion of the large heliostats with a spherical or parabolic canted structure and flat facets located in that area of the field, in which an average annual angle of incidence is less than 45% of the field's maximum annual angle of incidence and the angle of visibility $\alpha$ of the receiver is less than 15° and the heliostat distance to a base of a tower onto which the heliostats direct solar energy is greater than ten times an optical height of the tower;
   Area 3: Made up of medium size heliostats having a surface area of at least 20 m$^2$ and less than 120 m$^2$ with a spherical or parabolic canted structure and cylindrical facets which are located in that area of the field in which an average annual angle of incidence is greater than 45% of the field's maximum annual angle of incidence and the visibility of the receiver is low, and wherein a low visibility means having an angle of visibility $\alpha$ greater than 35°; and
   Area 4: Made up of small heliostats having a surface area of less than 20 m$^2$ located in that area of the field in which an average annual angle of incidence is less than 45% of the field's maximum annual angle of incidence and the visibility of the receiver is medium or low.

8. The mixed heliostat field of claim 7, wherein the field has a latitude of 37.34° and north field, angle of incidence less than 45° or average annual cosine effect lower than 0.78.

9. The mixed heliostat field of claim 7, wherein the heliostats of areas 1 and 2 each have a surface area of 120 m$^2$ with 28 facets distributed in 4 columns and 7 rows and the heliostats of area 4 have a surface area of 4 m$^2$ each.

10. The mixed heliostat field of claim 9, wherein the heliostats of area 3 have a surface area of 20 m² each.

11. The mixed heliostat field of claim 9, wherein the heliostats of area 3 includes small heliostats having a surface area of less than 20 m² for carrying out an active control that directs a reduced solar spot where required.

12. The mixed heliostat field of claim 11, wherein in said area 3 heliostats with a 4 m² facet are used.

13. The mixed heliostat field of claim 2, wherein the field has an atmospheric transmission coefficient above 0.95 and the heliostats are distributed in two areas:
- Area 5: receiver angle of visibility α greater than 15° and less than 25°, large heliostats having a surface area of greater than 120 m² with cylindrical or flat facets; and
- Area 6: angle of visibility α greater than 25°, reserved for small heliostats having a surface area of less than 20 m² with no astigmatism with reduced spot.

14. The mixed heliostat field of claim 2, wherein the field has an atmospheric transmission coefficient above 0.95 and the heliostats are distributed in three areas:
- Area 7: angles of incidence less than 45% of a maximum annual angle of incidence and receiver angle of visibility α less than 25°, heliostats with cylindrical or flat facets;
- Area 8: angle of visibility α greater than 25°, small heliostats having a surface area of less than 20 m² with no astigmatism with a reduced spot; and
- Area 9: angles of incidence greater than 45% of the maximum annual angle of incidence, reserved for heliostats with no astigmatism with reduced spot and spherical or cylindrical facet.

15. The mixed heliostat field of claim 2, wherein the heliostats are distributed in four areas as follows:
- Area 10: angles of incidence less than 45% of a maximum annual angle of incidence and receiver angles of visibility α less than 25°, with heliostats with cylindrical or flat facets;
- Area 11: angles of visibility α greater than 25°, small heliostats having a surface area of less than 20 m² with no astigmatism with a reduced spot;
- Area 12: angles of incidence less than 45% of the maximum annual angle of incidence, reserved for heliostats with no astigmatism with reduced spot and spherical or cylindrical facet; and
- Area 13: angles of incidence less than 30% of the maximum annual angle of incidence, reserved for heliostats with no astigmatism with reduced spot.

16. The mixed heliostat field of claim 1, wherein the plurality of heliostats comprises medium size heliostats, with a surface area of at least 20 m² and less than 120 m².

17. The mixed heliostat field of claim 16, wherein the medium size heliostats have spherical canted facets.

18. The mixed heliostat field of claim 16, wherein the medium size heliostats have cylindrical canted facets in a direction of the larger dimension.

19. The mixed heliostat field of claim 16, wherein the medium size heliostats have flat or spherical facets.

20. The mixed heliostat field of claim 16, wherein in areas of the field in which a receiver angle of visibility α is greater than 35°, medium sized or small heliostats are used, wherein a small heliostat is defined as having a surface area less than 20 m².

21. The mixed heliostat field of claim 1, wherein the plurality of heliostats comprises small heliostats with at least one single facet with surface area less than 20 m².

22. The mixed heliostat field of claim 21, wherein the facet is cylindrical.

23. The mixed heliostat field of claim 21, wherein the facet is flat or spherical.

24. The mixed heliostat field of claim 21, wherein the facet is spherical.

* * * * *